United States Patent [19]
Elkins

[11] Patent Number: 4,773,667
[45] Date of Patent: Sep. 27, 1988

[54] PROXIMITY HITCH

[76] Inventor: Johnny C. Elkins, Rte. 5, Box 5124C, San Angelo, Tex. 76904

[21] Appl. No.: 44,173

[22] Filed: Apr. 30, 1987

[51] Int. Cl.$^4$ .............................................. B60D 1/00
[52] U.S. Cl. ............................ 280/478 B; 280/479 R; 280/493
[58] Field of Search ............... 280/477, 478 A, 478 B, 280/478 R, 479 R

[56] References Cited

U.S. PATENT DOCUMENTS

| | | | |
|---|---|---|---|
| 2,703,243 | 3/1955 | Clark | 280/477 |
| 3,152,814 | 10/1964 | Wegener et al. | 280/479 R |
| 3,521,908 | 7/1970 | Carter | 280/479 R |
| 3,542,398 | 11/1970 | Melroe | 280/477 |
| 3,612,576 | 10/1971 | Marker | 280/478 B |
| 3,820,822 | 6/1974 | Henderson | 280/478 A |
| 3,989,270 | 11/1976 | Henderson | 280/478 A |
| 4,558,883 | 12/1985 | Bouma | 280/478 A |
| 4,589,672 | 5/1986 | Dickens | 280/478 B |

Primary Examiner—John J. Love
Assistant Examiner—Mitchell J. Hill
Attorney, Agent, or Firm—Marcus L. Bates

[57] ABSTRACT

A proximity hitch can be fitted to a towed vehicle, as for example a trailer, so that the trailer can be towed by a towing vehicle. The hitch comprises opposed main frame members which terminate in a flat mounted plate. A guide member is pivotally attached to the mounted plate and reciprocatingly receives a tongue therethrough. The tongue has a socket formed at one end thereof and a cam follower at the other end thereof. Opposed cam plates have confronting cam surfaces formed thereon with there being a notch formed between the cam surfaces. The cam follower is received within the cam notch when the proximity hitch is retracted. The cam follower rides against the cam surface as the socket is moved over a wide area of movement. The tongue and guide member are latched into a retracted position when the trailer is to be towed and unlatched when it is necessary to connect the trailer to the towing vehicle.

8 Claims, 4 Drawing Sheets

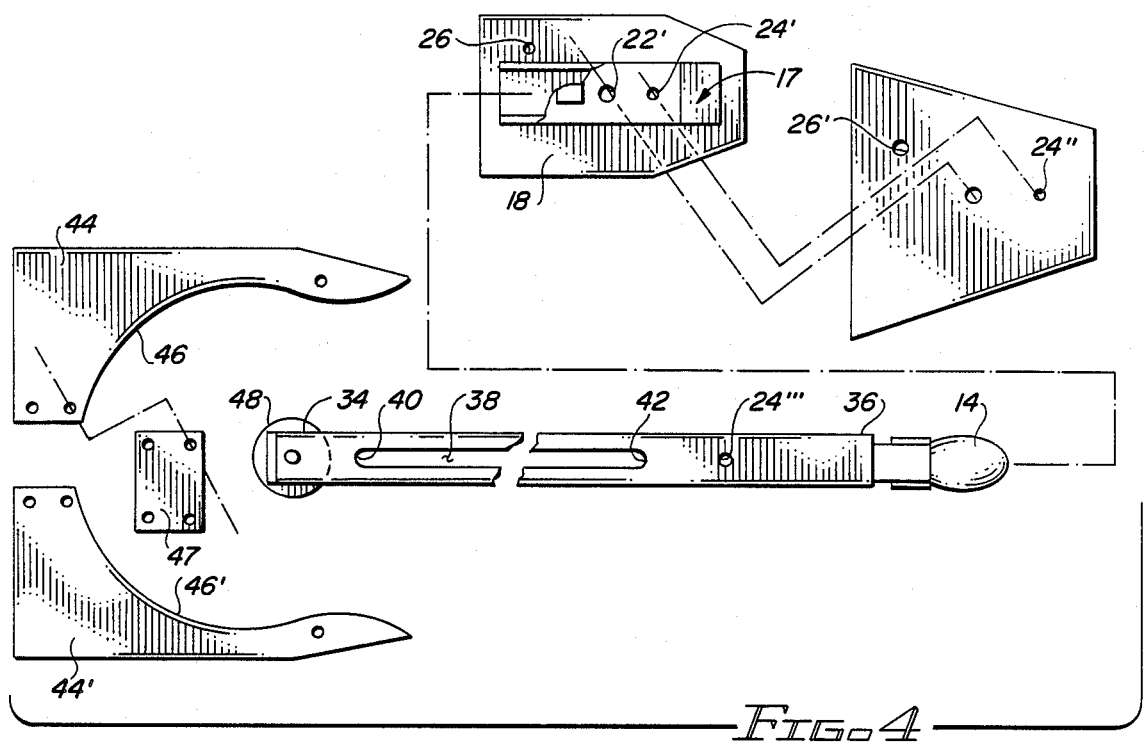
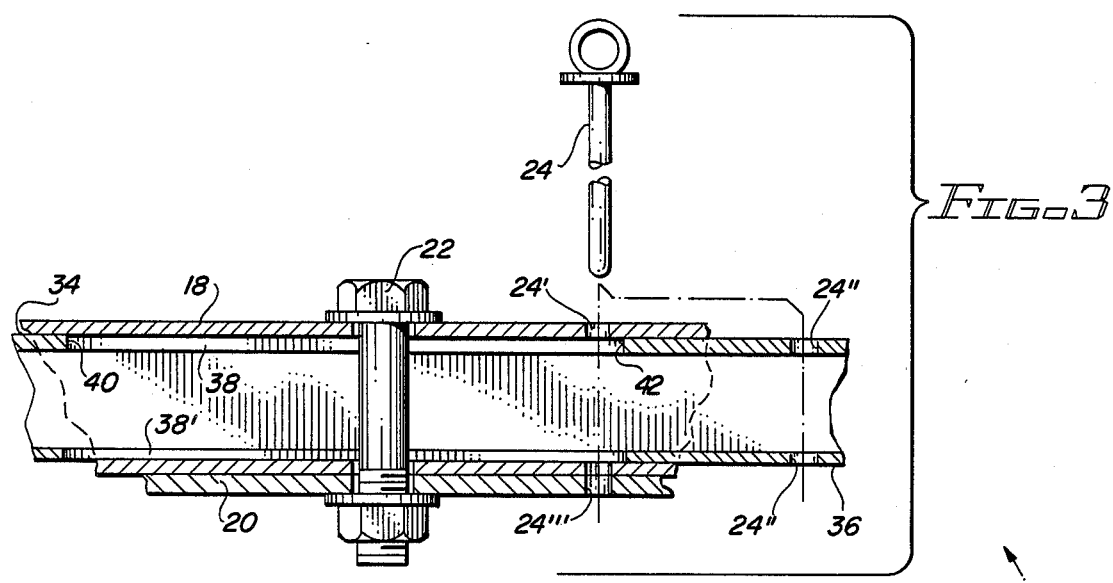
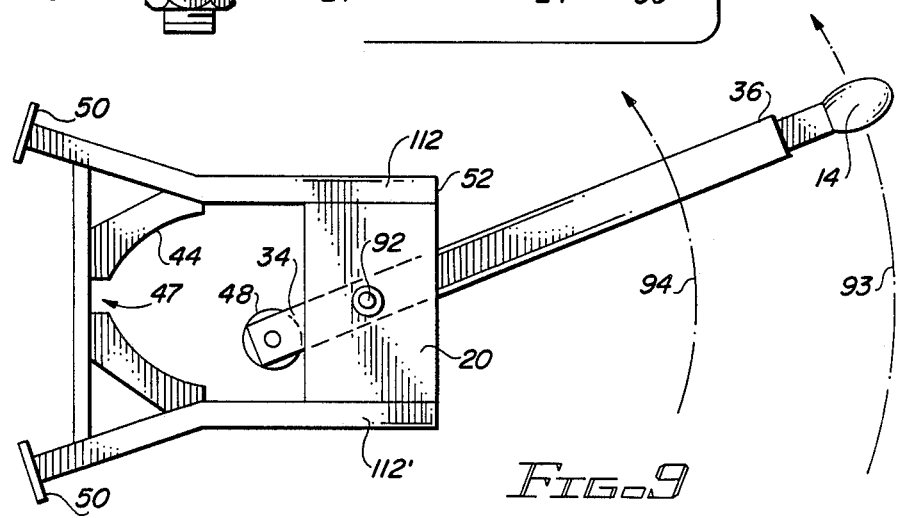

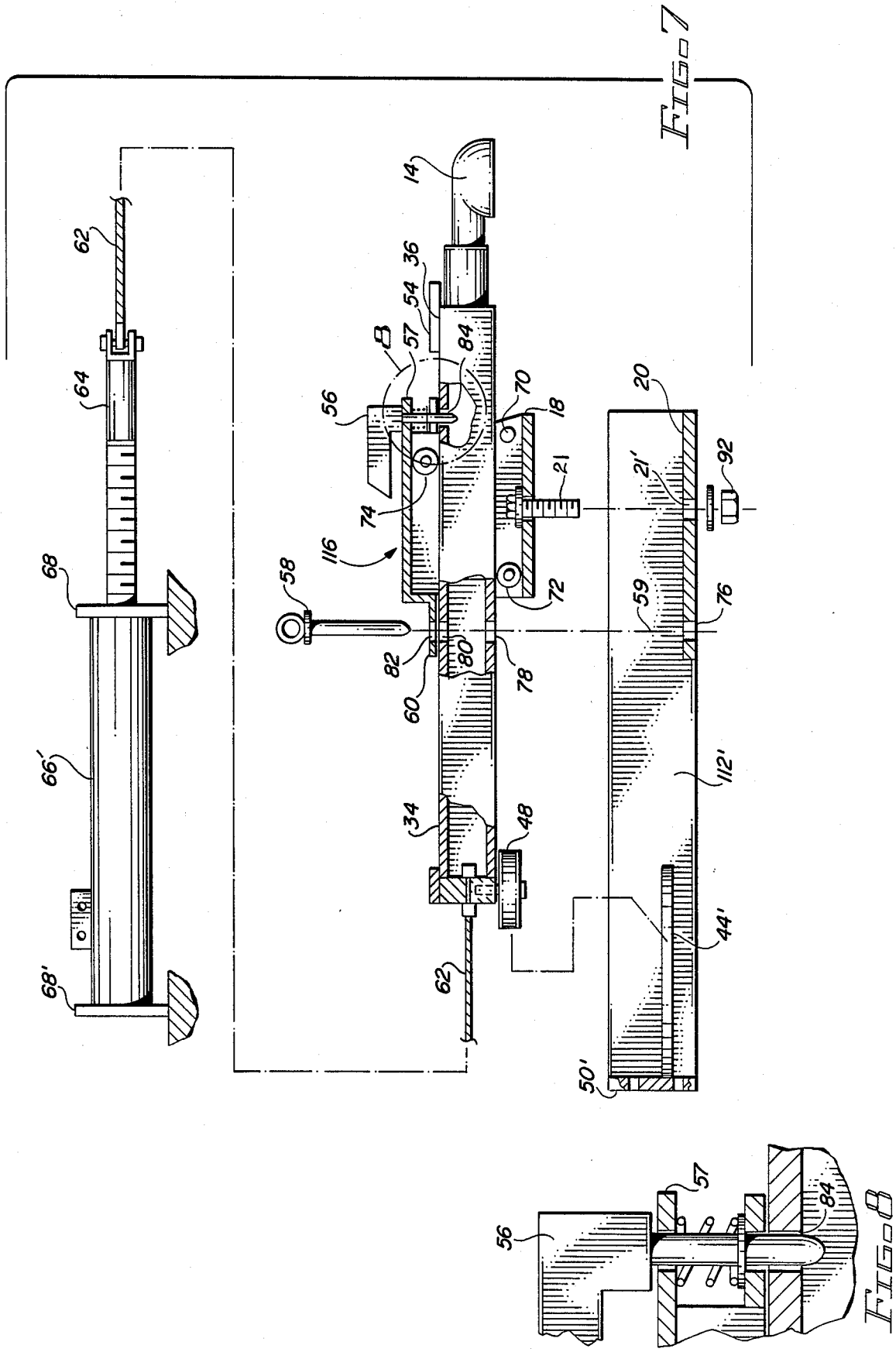

PROXIMITY HITCH

BACKGROUND OF THE INVENTION

Almost everybody at one time or another has connected a trailer to a towing vehicle. A small, lightweight trailer can readily be manipulated by the tongue and it therefore poses no particular problem because it can be shoved or pushed into a position that causes the socket of the trailer hitch to receive the ball of the towing vehicle hitch. However, where the trailer is large, especially a four wheel travel trailer or the like, the trailer hitch cannot be easily pushed or shoved into proper alignment with a ball hitch.

Over the years, one solution to this problem has been proposed by Clark U.S. Pat. No. 2,703,243; Marker 3,612,576; Henderson 3,989,270; and Dicken 4,589,672, which further show the background of this invention.

The present invention provides an improved trailer hitch which can be retrofitted to most any type trailer, and which enables the hitch to be easily connected to the towing vehicle in a new and novel manner.

SUMMARY OF THE INVENTION

A proximity hitch for attaching a towed vehicle to a towing vehicle. The hitch is fabricated into a unitary assembly of coacting parts which can be retrofitted to previously built trailers. The hitch comprises opposed main frame members which terminate in a socket at the forward end thereof by which the hitch can be attached to the ball of a towing vehicle.

A guide member is attached to a pivot plate, which is pivotally attached to a bearing plate. The bearing plate is attached to said main frame members. A tongue is telescopingly received in a captured manner by the guide member, and means are provided for reciprocating the tongue respective to the guide member. A cam follower is mounted on one opposed end of the tongue while said socket is mounted on the other opposed end thereof. Accordingly, movement of the tongue respective to the guide member moves the socket respective to the main frame members.

A cam plate is attached to the main frame members and provides a cam surface which defines an oblated opening within the cam plate against which the cam follower is received such that the cam follower describes a large loop as the socket is moved from a rear position to a forward position and side by side respective to the end of the frame.

The tongue is releaseably affixed to the guide member by a latch means, and means are provided by which the cam follower is locked within the cam plate. The pivot means extends through the housing, through the pivot plate, and through the bearing plate.

The coacting parts of the proximity hitch enables the towing vehicle to be positioned with the ball thereof placed in closed proximity of the socket of the hitch, and the socket subsequently manipulated respective to the main frame members and the ball, whereupon the socket is easily received by the ball, and thereafter the tongue is moved into the retracted configuration.

A primary object of the present invention is the provision of a proximity hitch by which a trailer can be attached to a towing vehicle with very little exertion being required of the person hitching the two together.

Another object of the present invention is the provision of a proximity hitch by which a trailer can be attached to a towing vehicle with a minimum of effort, wherein the hitch can be retrofitted to any number of different trailers.

A still further object of this invention is the provision of a proximity hitch which can easily be attached to the towing vehicle when the towing vehicle is parked in close proximity to the hitch, and which includes means by which the hitch can be moved vertically, laterally, and longitudinally.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 3 is a broken, enlarged, part cross-sectional view taken along line 3—3 of FIG. 2;

FIG. 4 is a disassembled view of the hitch disclosed in FIGS. 1 and 2;

FIG. 7 is a disassembled view of another alternate embodiment of the present invention;

FIG. 8 is an enlarged, fragmentary, detailed view showing part of the apparatus previously disclosed in FIG. 7; and, FIG. 9 is a bottom view of the hitch disclosed in FIGS. 5, 6, and 7.

DETAILED DESCRIPTION OF THE PREFERRED EMBODIMENTS

Figure 1:
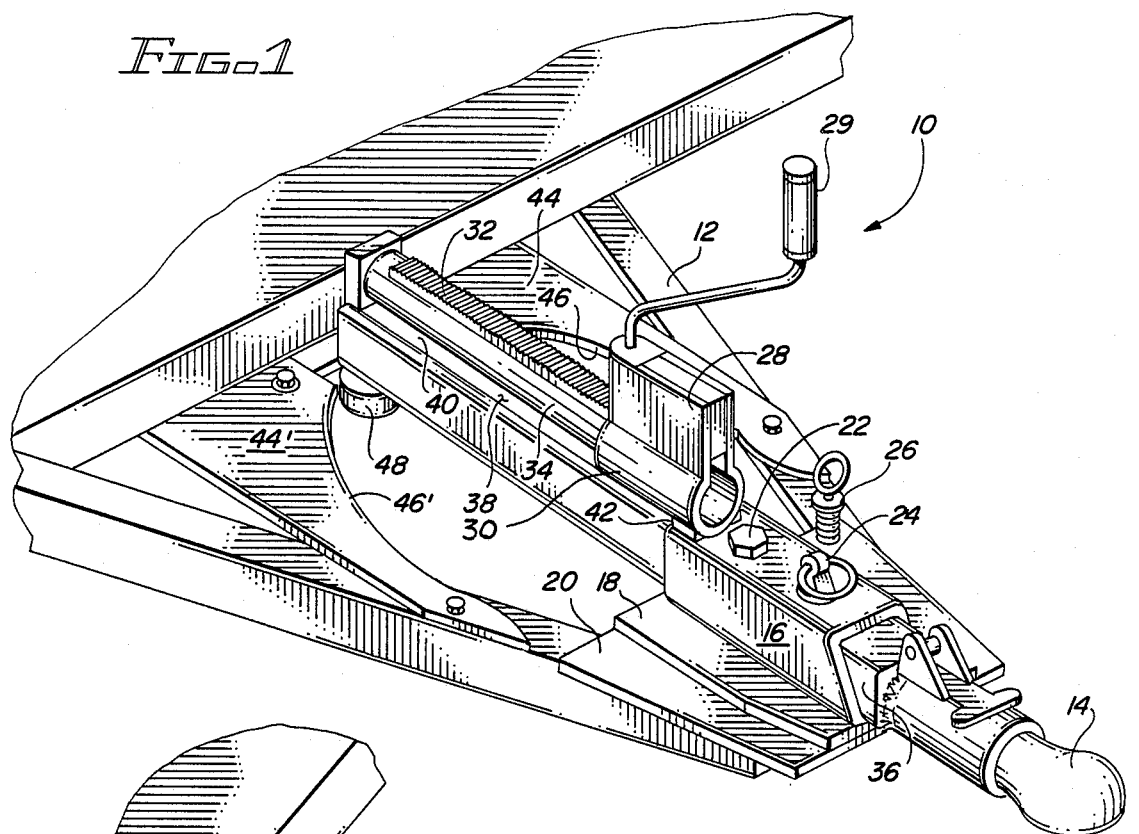
FIG. 1 is a fragmentary, perspective view of a proximity hitch made in accordance with the present invention.

In the drawings, FIGS. 1-4 illustrate the details of a proximity hitch 10 made in accordance with the present invention. The proximity hitch 10 is affixed to the opposed main frame members 12 of a trailer or the like to be towed. The forward end of the proximity hitch 10 terminates in a socket 14. The socket 14 receives a ball located on the towing vehicle (not shown) so that the towing vehicle can move the trailer to which the hitch assembly 10 is affixed.

Guide member 16 has a sloped forward entrance 17. The guide member is in the form of a square or U-shape channel rigidly affixed to a pivoted bearing plate member 18. The plate member 18 and guide member 16 therefore preferably are made integral respective to one another. A fixed bearing plate 20 is affixed to the marginal forward end of the main frame members 12. Pivot means 22, preferably in the form of a large one inch diameter bolt, is received through the guide member 16, pivotal bearing plate 18, and fixed bearing plate 20. This enables plate member 18 to slidably pivot on plate member 20 about the pivot means 22. That is, the confronting faces of plate members 18 and 20 pivotally engage one another.

A locking pin 24 is positioned at the upper surface of the guide member 16. A locking pin 26 locks the plate members 18 and 20 together. A retracting jack mechanism 28, which is commercially available, has the usual handle 29 which extends and retracts the jack mechanism. The jack body 30 is attached to the rear end of the upper surface of the guide member 16 while the free end 31 of the rack part 32 of the jack is attached to the rear end of a tongue 36 of the hitch assembly. The tongue 36 has a longitudinally extending vertical slot 38 formed through a medial length thereof. The slot extends from the far end 40 to the near end 42.

A cam plate 44, 44' is attached to the opposed frame members 12 and presents confronting cam surfaces 46, 46' against which there is rotatably received a cam follower 48. The cam follower 48 is rotatably attached to the rear end of the tongue 36 in opposition to the free end 31 of the jack rack 32. A notch is formed between and interrupts the cam surfaces 46, 46'. The notch is positioned so that the cam follower 48 is received therein and between the confronting sides 46, 46' of the cam plates 44, 44'. The notch plate 47' therefore defines the notch 47 and bears against the retracted cam follower.

In FIGS. 3 and 4, the cooperation between the slot 38 of tongue 36 and the pivot means 22 is more specifically illustrated. The pivot means 22 is a large, one inch diameter bolt having a lock nut thereon. The tongue 36 can slide from a retracted position into a forward position, where the jack pad or free end 31 contacts the main body 30 of the jack. Locking pin 26 is received through apertures 26' and prevent plate 18 from pivoting respective to plate 20. Locking pin 24 extends through apertures 24', 24", 24'" and prevent the tongue from moving respective to the guide member 16 as well as pinning the plates 18 and 20 together. Hence, the pin 26 can be eliminated if desired, but is preferred for safety purposes.

Figure 2:
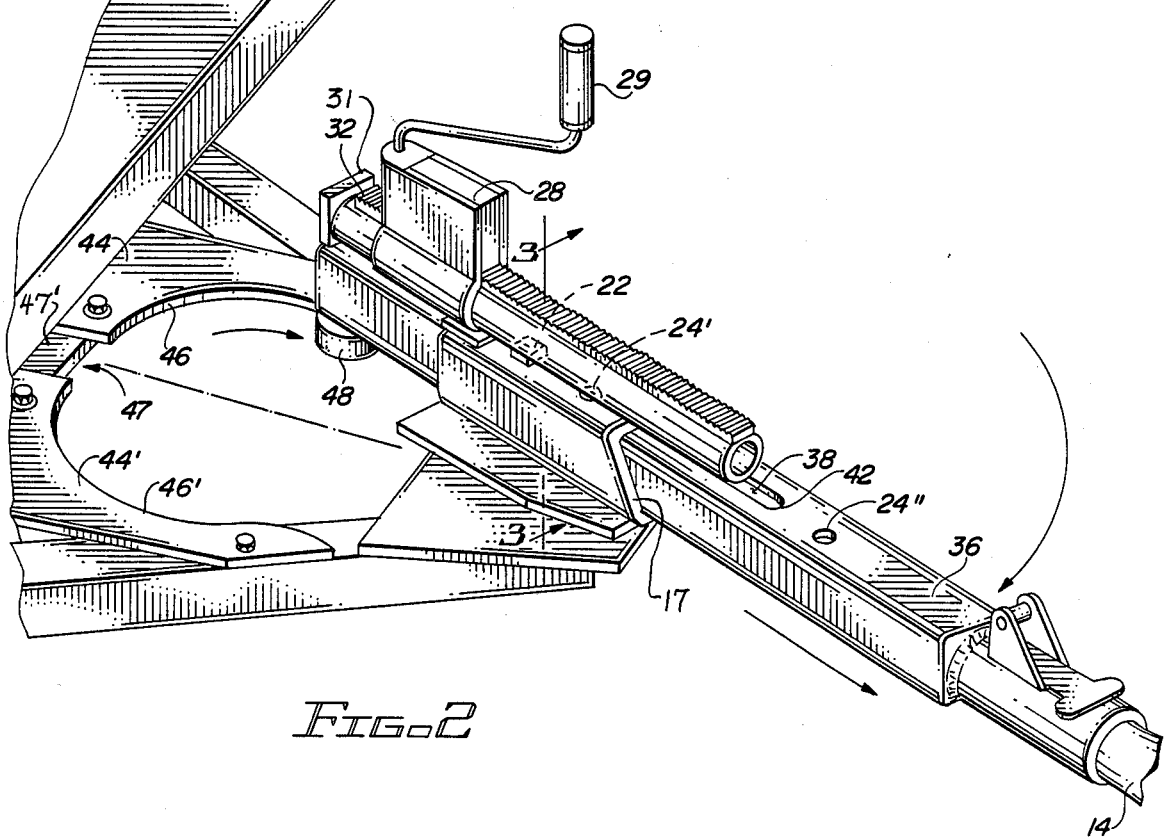
FIG. 2 is a fragmentary, perspective view of the hitch disclosed in FIG. 1 illustrated in an alternant configuration.

FIG. 1 of the drawings illustrates the proximity hitch in the retracted position, which is the position of traveling down the road connected to a towing vehicle. FIG. 2 shows one of the extended positions of the proximity hitch as it is being manipulated so that it can easily be attached to a vehicle. In order to attach the hitch 10 to a vehicle, the pins 24 and 26 are pulled, the handle 29 is turned so that the tongue is telescopingly extended respective to the guide member 16. At this time, the cam follower is released from the notch at 47 and the socket 14 can be maneuvered in an arcuate manner between the confines presented by the cam faces 46, 46' so that the socket 14 can be directly superimposed over a ball hitch by judicious manipulation of the handle 29 and pivoting of the tongue. The trailer is lowered until the socket is latched to the ball, and then handle 29 is rotated, forcing cam follower 48 rearwardly into rolling engagement with the cam surface 46, 46'. Continued rearward motion of the cam follower causes the follower to continue making rolling contact about the cam surface until it is guidably received within slot 47. During this time, the trailer and vehicle are moved towards and into alignment with one another by the action of the jack mechanism. Next, the pins 24 and 26 are placed within the appropriate pin holes, and the trailer and vehicle are ready for the road.

In the embodiment of the invention set forth in FIGS. 5-8, the proximity hitch 110 is provided with splice plates at 50, 50' so that the trailer can be provided with complementary splice plates at the end of the main frame members 112, 112'. The splice plates of the hitch 110 are easily mated to the trailer splice plates by merely making up the illustrated four bolts located on either side of the main frame. This enables the entire hitch assembly 110 to be prefabricated separate from the trailer. Subsequently, the prefabricated hitch is attached in joined relationship to the splice plates of the trailer as particularly seen in FIGS. 5 and 6.

Numeral 52 indicates the forward or free end of the main frame members 112, 112'. The forward end of the tongue is provided with an artistically designed hand hold 54 that is a frustum of a polygon, and which is located rearwardly of socket 14. Locking pin 56 is always biased into the locked position and is slidably received by the illustrated pair of forwardly extending spaced lugs 57. Locking pin 58 is located rearwardly of the guide member and locks the tongue to a rearwardly extending lug connected to the guide member.

As seen in FIG. 7, the locking pin 58 is aligned with vertical axis 59 which in turn is aligned with apertures 76, 78, 80, and 82, respectively, formed on the fixed plate 20, lower and upper surfaces of the tongue, and the rearwardly extending lug. The lug 60 also serves as a rear upper guide for maintaining the tongue in proper aligned relationship with the longitudinal axis of the guide means 116. A cable 62 is suitably arranged respective to the rear end of the tongue so that when sufficient tension is placed on the cable, the tongue is forced to move rearwardly until the cam follower 48 is received within the slot between the cam plates.

In FIG. 7, a jack screw 64, 66', preferably electrically actuated, is bolted between the frame members 68, 68' of a trailer. The frame members 68, 68' are spaced rearwardly of the front of the trailer. Jack screw 64 is telescopingly received within housing 66' and moves the cable 62 longitudinally respective to the tongue so that the tongue can be extended or retracted respective to the guide member 116. The guide means 116 includes a round guide 70 and roller 72 that guidably receive the undersurface of the tongue. The roller and guide are affixed to the vertical opposed sidewalls of the guide member 116. Upper roller 74 and rear upper guide or leg 60 bear against the upper surface of the tongue. Accordingly, the tongue is captured in low friction relationship between the spaced rollers and guides 60, 70, 72, and 74 which receive the tongue in close tolerance relationship so that there is very little sideways or vertical play between the guide member and the tongue.

As seen in FIGS. 7 and 8, the spring loaded pin 56 reciprocates within the spaced apart forwardly extending lugs 57, and engage apertures 84 formed in the upper surface of the tongue, thereby latching the guide member and tongue together. Pin 58 is received through aperture 76 of the fixed plate member and through apertures 78, 80 of the tongue, and through aperture 82 of the lug 60 of the guide member. This prevents movement between the tongue, guide member, and fixed plate member, and also prevents the tongue from being pivoted respective to pivot means 21.

Figure 5:
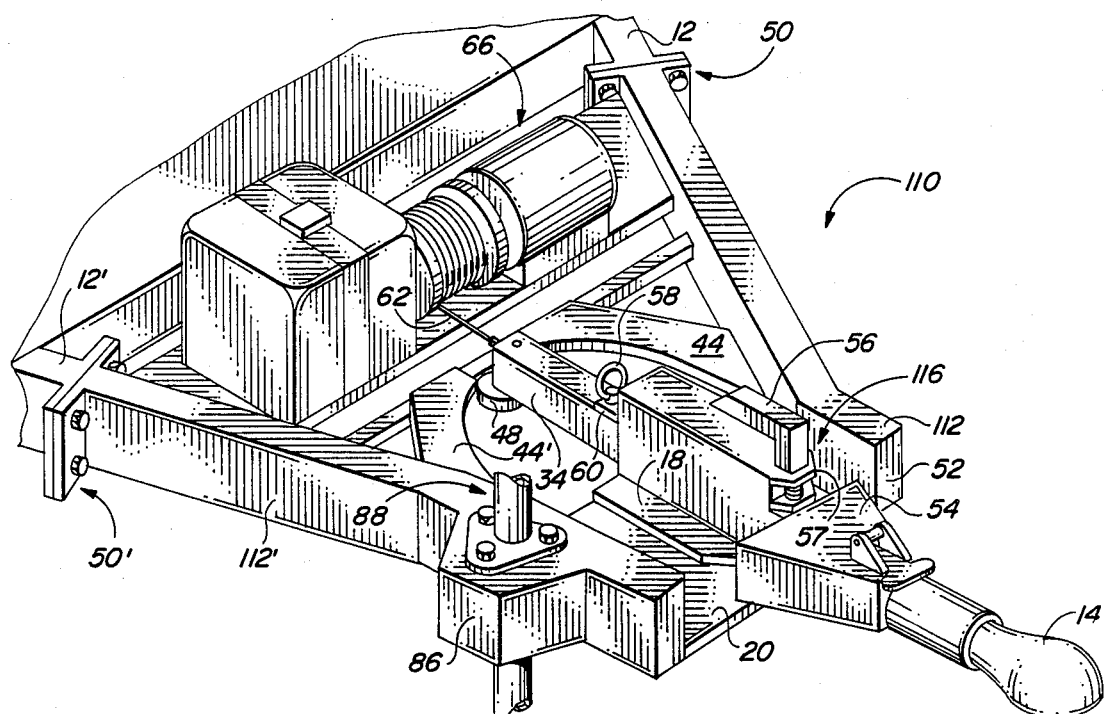
FIG. 5 is a fragmentary, perspective view of another embodiment of the present invention.
Figure 6:
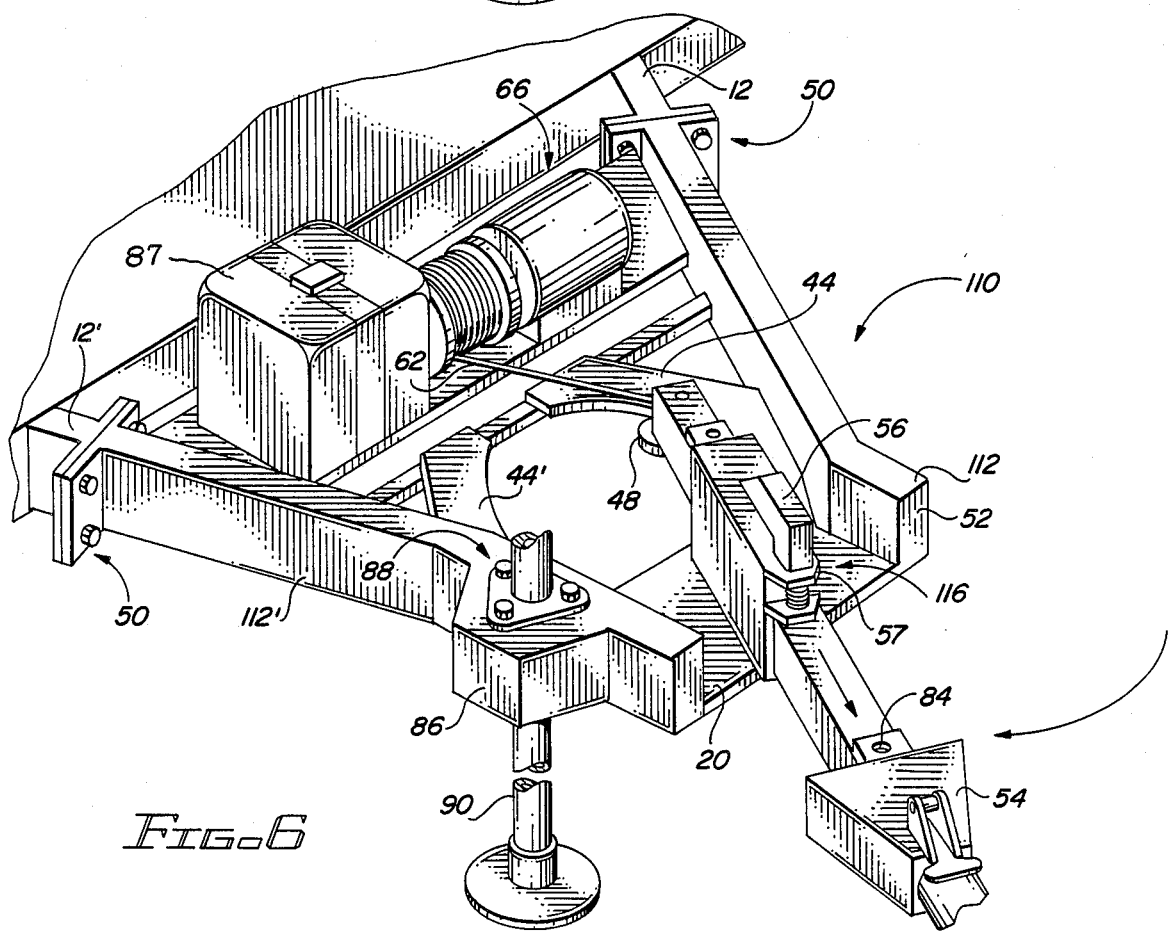
FIG. 6 is a perspective view showing the hitch of FIG. 5 in an alternant configuration.

The guide member receives a large bolt through the pivoted or fixed plates 18 and 20 thereof which is fastened by the illustrated lock nut 92 in FIG. 7. In FIGS. 5 and 6, numeral 86 illustrates a laterally extending built up jack boss to which there is bolted an electrically actuated jack device 88 which extends and retracts jack leg 90 respective to the boss 86. A battery is housed in container 87 adjacent to winch 66, and suitable circuitry is included along with switching and the like by which the winch 66 and jack 88 can be electrically operated so that the front of the trailer can be selectively raised or lowered, while at the same time the tongue of the hitch can be extended or retracted as may be desired noting this action has taken place in FIG. 6 of the drawings.

In operation of the apparatus set forth in FIGS. 5-7, the winch 66 is operated to slacken cable 62. Pin 58 is removed and pin 56 is lifted while the tongue is telescoped outwardly toward the ball that is to be received within socket 14. The jack apparatus 88 is energized to raise or lower the trailer as may be needed in order to set the socket 14 onto the ball of the towing vehicle. Next, the winch 66 is again energized in order to retract the tongue until the follower 48 is guidably received within the illustrated slot. The spring loaded pin 56 will automatically return to the lock position. Pin 58 is replaced within the appropriate apertures. The jack 88 retracts leg 90 and the trailer and vehicle are ready for the road.

The winch 66 can be placed in the illustrated position of FIG. 5, with there being appropriate guide means for maintaining the cable 62 properly aligned respective to the cam slot and the cam follower so that the follower is pulled against the cam surface and into the slot therefor. Alternatively, the winch 66' can instead be in the form of FIG. 7 wherein a jack screw is mounted to trailer structure 68, 68' so that as the screw 64 is extended and retracted by the motor contained within housing 66', the cable 62 is placed in tension, causing the cam follower to return to the cam slot.

In FIG. 9, numerals 93 and 94 indicate the radial distance that tongue 36 can be extended respective to the end of the trailer hitch. The socket 14 can be moved along the illsutrated segment of a circle which depends upon the spacing between pivot 92, cam follower 48, and the spacing between main body members 112, 112'.

I claim:

1. A proximity hitch by which a towed vehicle can be releasably connected to a towing vehicle;

said hitch comprises opposed main frame members connected at a rear end thereof to the towed vehicle and terminating in a socket at a forward end thereof;

a horizontal fixed bearing plate attached to a forward marginal end of said main frame members; a guide member attached to a pivotal bearing plate by pivot means by which said guide member is pivotally attached to said fixed bearing plate, an elongated, unitary tongue telescopingly received by said guide member; means reciprocating said tongue respective to said guide member; said tongue has a cam follower at a rear end thereof with said socket being mounted at the forward end thereof; said pivot means is a pivot bolt that extends through said guide member, pivotal bearing plate, and fixed bearing plate;

an elongated slot vertically arranged through a medial length of the tongue which receives said pivot bolt therethrough so that said tongue slides within the confines of the opposed ends of the slot while the pivotal bearing plate, guide member, and tongue are pivoted about said pivot bolt;

a cam plate attached to said opposed main frame members and having opposed cam surfaces formed thereon against which said cam follower is received such that the cam follower describes a large loop as the socket is moved from a rear position to a forward position respective to the forward end of the main frame;

latch means by which the tongue is releasably affixed to said guide member by which said cam follower is locked within said cam plate.

2. The hitch of claim 1 wherein said means for reciprocating said tongue includes a screw jack means connected between the cam end of the tongue and the guide member;

whereby the cam end of the tongue is moved by the jack means and forced to move in a telescoping manner respective to the guide member.

3. The hitch of claim 1 wherein said means for reciprocating said tongue includes a cable, winch means for moving said cable, a free end of said cable is connected to the rear end of said tongue and arranged to force the tongue rearward.

4. The hitch of claim 1 wherein splice plates are arranged at the rear of the hitch by which the hitch can be removably bolted to the forward end of a trailer.

5. A hitch apparatus by which a towed vehicle can be releasably connected to a towing vehicle;

said hitch apparatus has a forward end opposed to a rear end, said hitch apparatus comprises opposed main frame members connected at the rear end to the towed vehicle and terminating in a socket at the forward end thereof;

a bearing plate attached in a horizontal position to said main frame members; guide means pivotally attached to said bearing plate, a tongue telescopingly received by said guide means, whereby said tongue means can reciprocate respective to said guide means; said tongue means has a cam follower at a rear end thereof with said socket being mounted at the forward end thereof;

a cam plate attached to said main frame members at a location rearwardly of said bearing plate and having opposed cam surfaces formed thereon against which said cam follower is received such that the cam follower describes a large loop as the socket is moved from a rear position to a forward position respective to the forward end of the main frame members;

latch means by which the tongue is releasably affixed to said guide means and said bearing plate; and, means by which said cam follower is locked within said cam plate;

said guide means includes a pivot plate, a vertical pivot means by which the bearing plate and pivot plate pivotally abut one another in a slidable manner;

said guide means includes an elongated housing affixed to said pivot plate; said tongue is reciprocatingly received within said housing.

6. The hitch of claim 5 and further including means for reciprocating said tongue including a screw jack means connected between the cam end of the tongue and the guide means;

whereby the cam end of the tongue is moved by the screw jack means and forced to move in a telescoping manner respective to the guide means.

7. The hitch of claim 5 and further including a means for reciprocating said tongue including a cable, winch means for moving said cable, a free end of said cable is connected to the rear end of said tongue and arranged to force the tongue rearward.

8. The hitch of claim 5 wherein splice plates are arranged at the rear of the hitch by which the hitch can be removably bolted to the forward end of a trailer.

* * * * *